United States Patent
Ganser et al.

(10) Patent No.: US 6,431,153 B2
(45) Date of Patent: Aug. 13, 2002

(54) MOTOR CONTROL METHOD AND APPARATUS FOR INTERNAL COMBUSTION ENGINE

(75) Inventors: Thomas Ganser, Wernau; Charles Robert Koch, Remseck/Pattonville; Dietmar Lauffer, Herzogenaurach; Kurt Maute, Sindelfingen; Andreas Schmidt, Muehlacker; Markus Stalitza, Schwaebisch Gmuend; Johannes Wehle, Moeglingen, all of (DE)

(73) Assignees: DaimlerChrysler AG; Robert Bosch GmbH, both of Stuttgart (DE)

( * ) Notice: Subject to any disclaimer, the term of this patent is extended or adjusted under 35 U.S.C. 154(b) by 10 days.

(21) Appl. No.: 09/759,131

(22) Filed: Jan. 16, 2001

(30) Foreign Application Priority Data

Jan. 13, 2000 (DE) .......................... 100 01 062

(51) Int. Cl.$^7$ .......................... F02P 5/15; F02M 51/00
(52) U.S. Cl. .................. 123/480; 123/406.47; 123/492; 701/105
(58) Field of Search ................................. 123/478, 480, 123/486, 492, 493; 701/104, 105, 115

(56) References Cited

U.S. PATENT DOCUMENTS

| | | | | |
|---|---|---|---|---|
| 4,841,937 A | * | 6/1989 | Nagaishi ..................... | 123/492 |
| 5,054,451 A | * | 10/1991 | Kushi ......................... | 123/478 |
| 5,094,209 A | * | 3/1992 | Kishida et al. ......... | 123/406.47 |
| 5,255,655 A | * | 10/1993 | Denz et al. .................. | 123/492 |
| 5,611,315 A | * | 3/1997 | Dohta et al. ................ | 123/492 |
| 5,642,722 A | * | 7/1997 | Schumacher et al. ....... | 123/480 |
| 5,819,714 A | * | 10/1998 | Bush et al. .................. | 123/480 |
| 6,354,274 B1 | * | 3/2002 | Shima et al. ............... | 123/478 |

FOREIGN PATENT DOCUMENTS

DE 196 27 280 A1 7/1996

* cited by examiner

Primary Examiner—Willis R. Wolfe
(74) Attorney, Agent, or Firm—Crowell & Moring LLP (57) ABSTRACT

In a motor control method and apparatus for an internal combustion engine, a point for the beginning of injection moment and injection period for each cylinder are determined in a load-controlled way in a motor controller and supplied to the actuators for execution of the injection. To improve the response characteristic of the internal combustion engine, control information for injection of the cylinder currently to be addressed is transmitted as reserve information for the subsequent cylinder in every transmission cycle. In the event of a load increase, reserve information from the previous transmission cycle is used to control injection in the subsequent cylinder.

12 Claims, 5 Drawing Sheets

MOTOR CONTROL METHOD AND APPARATUS FOR INTERNAL COMBUSTION ENGINE

BACKGROUND AND SUMMARY OF THE INVENTION

This application claims the priority of German patent document 100 01 062.8, filed Jan. 13, 2000, the disclosure of which is expressly incorporated by reference herein.

The present invention is directed to a motor control method and apparatus for an internal combustion engine.

A controller of this generic type is described in German patent document DE 196 27 280 A1. Its function is to control both fuel injection and ignition for each cylinder by generating a pulsed control signal. In crank angle synchronous combustion cycles, control data sets are generated in the controller taking into account the load at the internal combustion engine: injection time increases with an increase in the load, generating a larger motor torque, and decreases with a reduction in the load. The generated control signals are supplied to those actuators and components that adjust ignition and injection of each cylinder. The various cylinders of the internal combustion engine are supplied in successive cycles with the control data sets for injection and ignition.

In this context, the problem can arise that with high loads or greatly increasing loads, injection time increases to such an extent that, within one working cycle of the internal combustion engine, the time period available for data transmission and injection of fuel into a cylinder is insufficient. As a result, injection time must be limited to a value which is smaller than the theoretical optimum. An increase of the time period for injection to the target value can only be achieved in a later transmission cycle; this, however, results in delayed power build-up which the driver perceives as a poor response characteristic of the internal combustion engine. In idle running for instance, the power build-up of the internal combustion engine reacting to the load increase with a delay can result in "stalling" the engine if a load increase suddenly occurs, since the engine cannot respond quickly enough to the load demand.

One object of the invention is to improve the response characteristic of internal combustion engines in the event of load changes.

This and other objects and advantages are achieved by the motor control method and apparatus according to the invention, which provides that in every new transmission cycle a control data set containing both control information for injection of the cylinder currently to be addressed, and reserve information for injection of the cylinder to be addressed in the following cycle is generated in the motor controller. During every transmission cycle, the control data set generated in the motor controller is transmitted to the actuators of the corresponding cylinder which carry out the injection, or to a valve control unit controlling these actuators.

The twofold transmission of control information—for the cylinder that is currently addressed and for the following cylinder—has the advantage that during every transmission cycle, control information for two successive cylinders is provided; this offers the possibility, particularly in case of a load increase, that the subsequent cylinder can fall back on the reserve information that is generated and transmitted in the previous transmission cycle for controlling the injection. This technique ensures that in the event of a load increase accompanied by a longer injection period per transmission cycle, a longer time period is available for injection because the cylinder can fall back on reserve information transmitted and saved in the previous cycle, if necessary, so that the window of time available for injection for the corresponding (following) cylinder is enlarged. As a result, in the event of a load increase, control information originating from the directly preceding cycle is immediately available. This reduces the time needed for adjusting to the current load to a minimum and significantly improves the response characteristic of the internal combustion engine.

If the internal combustion engine runs in a stable mode, however, with a load that remains essentially constant, the cylinders currently to be addressed are provided with current control information. Reserve information that is generated and transmitted at the same time is saved without being actually used in stable running mode, since it is intended exclusively to define injection data of the subsequent cylinder in the event of a load increase with a greatly increasing injection period.

In accordance with a useful further development, the procedure provides that in the event of a load increase, the cylinder to be addressed currently receives reserve information from the previous transmission cycle; simultaneously, a new set of control data is generated by the motor controller that contains control information for the next following cylinder and reserve information for the next to next cylinder. This procedure ensures that, synchronous with the fixed crank angle, a control data set is generated and transmitted, the control information contained in the control data set being a function of the load. For changes towards higher loads and correspondingly longer injection time periods, two successive control data sets contain control information for a total of four successive cylinders; in this case, distribution logic ensures that the first cylinder is first provided with current control information of the first control data set; that the following cylinder is provided with reserve information of the first control data set; that the subsequent cylinder is then provided with the current control information of the second control data set; and that finally, the cylinder following thereafter is provided with reserve information of the second control data set. Thus it is ensured that each cylinder is provided with information for any type of load situation.

In particular, the data sets contain cylinder specific information regarding lambda control, cylinder deactivation, electronic spark control, etc.

In a stable running mode, during which a sufficiently long time period is available in every transmission cycle for generation and transmission as well as for injection into a current cylinder, two successive control data sets contain control information for a total of three successive cylinders. First, the first cylinder is provided with current control information of the first control data set while reserve information is saved. In the following cycle, the following cylinder is provided with current control information of the second control data set while reserve information of the second control data set intended for the next to next cylinder is stored in a memory unit and overwrites the reserve information from the previous control data set.

For a load reduction, if the start of fuel injection into the current cylinder falls into a later transmission cycle due to the decreased injection period, control information and reserve information that are essentially constant in successive control data sets are transmitted to the cylinder currently to be addressed in at least two successive transmission cycles, thus constituting an advantage. The control data set that is newly generated in every transmission cycle remains essentially constant over at least two successive transmission cycles until the moment for injecting fuel into the cylinder currently to be addressed falls into the transmission cycle of the control data set. This procedure ensures that, even in the event of a significant load decrease accompanied by a significant reduction of the injection period, the cylinder currently to be addressed is provided with control information assigned to this cylinder.

In accordance with the invention, the motor control device includes a motor controller in which, in a load-controlled way, control data sets are generated with control information and reserve information. It also includes at least one valve control unit communicating with the motor controller to which a memory unit is assigned in which reserve information from the control data set can be saved for at least one transmission cycle. In stable running mode, the current control information from the control data set is provided to the actuators for the cylinder currently to be addressed; the reserve information transmitted with the current control data set is stored in the memory unit of the valve control unit, whereby the reserve information from the current transmission cycle overwrites information from the previous cycle. In the event of a load increase, however, the cylinder currently to be addressed is not provided with current control information but with reserve information from the previous transmission cycle.

Both the procedure in accordance with the invention and the control device in accordance with the invention are suited for use with variably adjustable gas shuttle valves, particularly electro-magnetically operable gas shuttle valves, for which the opening moment can purposely be varied as a function of the injection period. Air supply, injection values and advantageously also ignition data are preferably controlled by means of the valve control unit to ensure that all control data are generated and transmitted consistently.

Other objects, advantages and novel features of the present invention will become apparent from the following detailed description of the invention when considered in conjunction with the accompanying drawings.

DETAILED DESCRIPTION OF THE DRAWINGS

Figure 1:
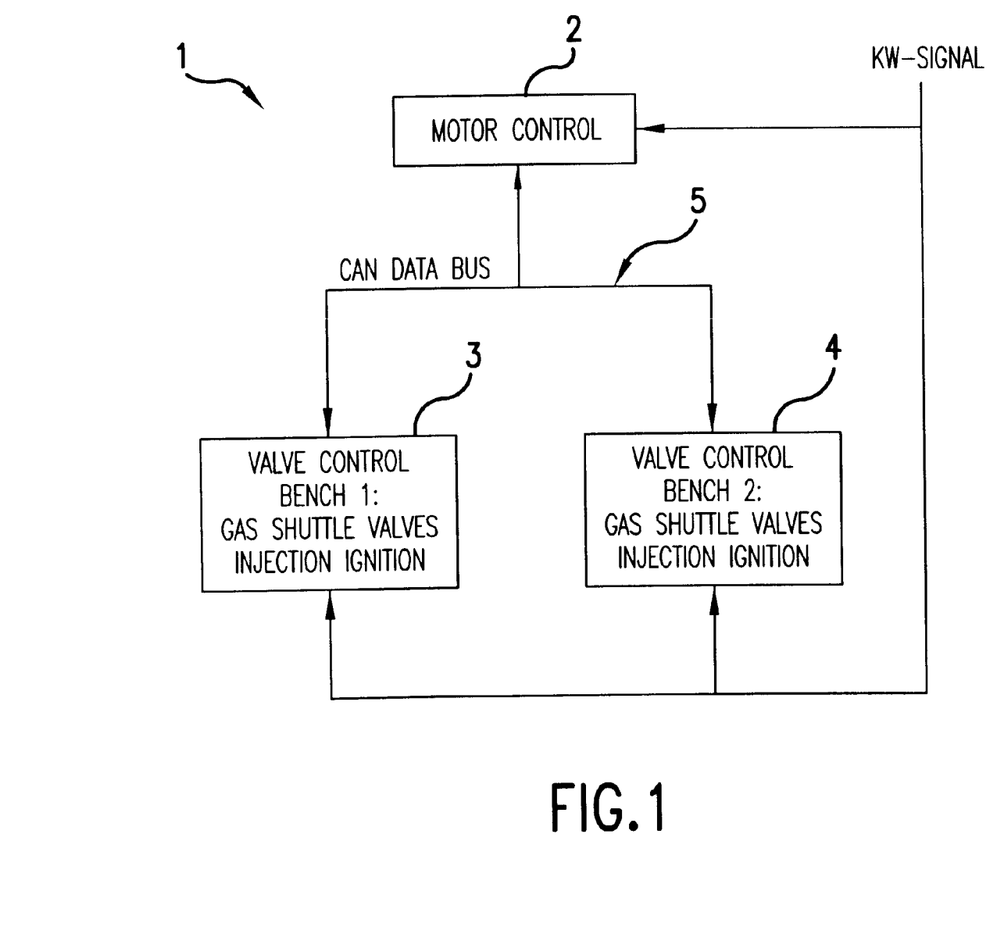
FIG. 1 is a conceptual block diagram which shows the structure of the motor control device according to the invention.

The motor control device (1) according to FIG. 1 includes a motor controller (2) and two valve control units (3) and (4); each of the valve control units is assigned to a cylinder bench of an internal combustion engine, particularly of an Otto engine. In the motor control device (2), control data sets are generated which are supplied to valve control units (3) and (4) in crank angle synchronous time intervals through communication lines (5) in form of a CAN data bus. For crank angle dependent control, a crank angle signal is transmitted to both motor controller (2) and valve control units (3) and (4). In the valve control units (3) and (4) which each are assigned to a cylinder bench of the internal combustion engine, the control data sets received from the motor controller (2) are transformed into actuating signals which are supplied to actuators for controlling gas shuttle valves, injection and ignition of each cylinder.

Figure 2:
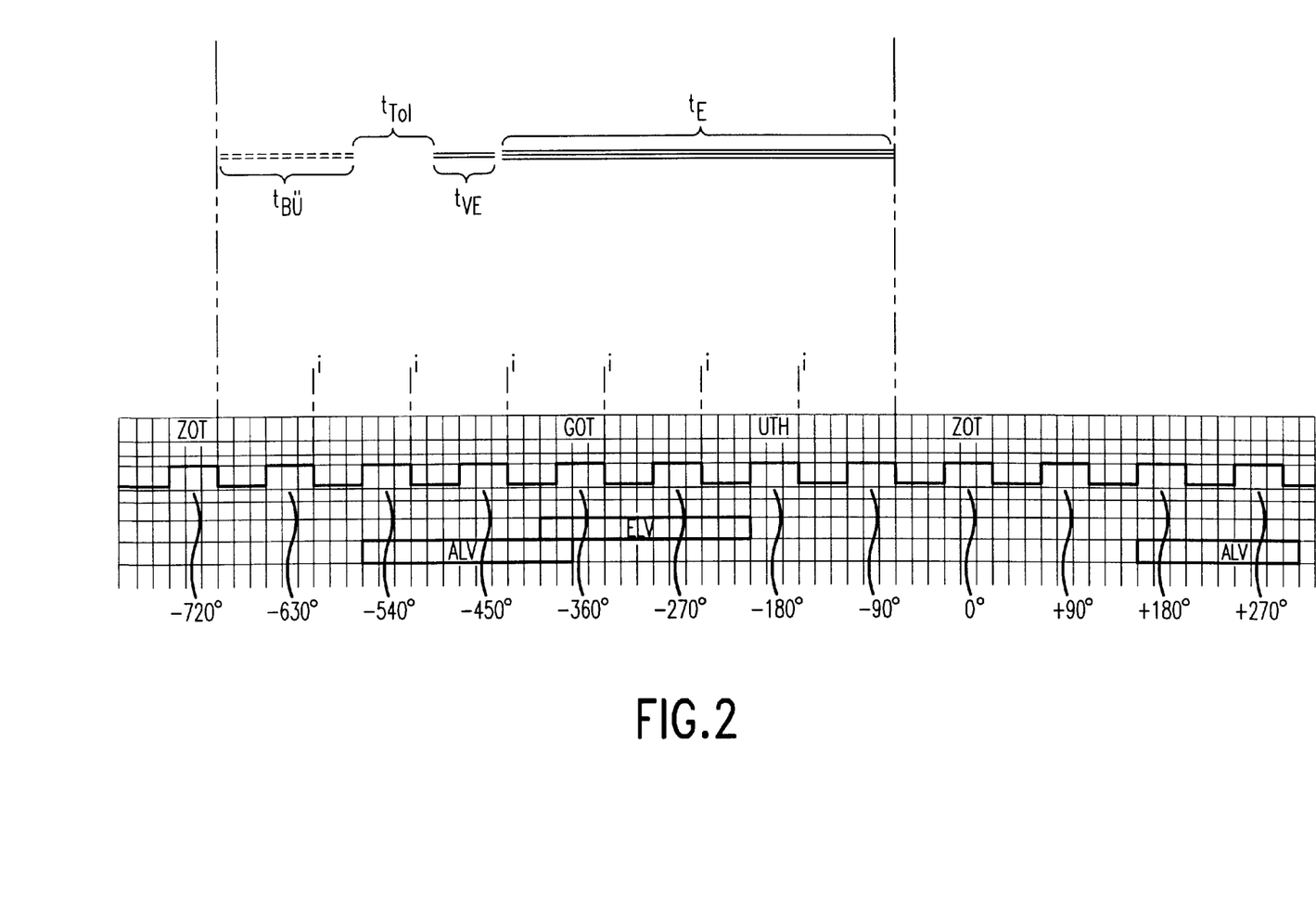
FIG. 2 is a graphic depiction of an injection and combustion cycle of a cylinder, recorded over crank angle synchronous ignition intervals.

FIG. 2 shows a schematic depiction of the injection and combustion cycle of a cylinder represented by crank angle synchronous ignition intervals. A transmission cycle (i) for generating and transmitting a control data set in the motor controller or from motor controller to valve control unit takes place between each of those intervals. FIG. 2 represents the situation for an eight-cylinder engine for which the ignition interval is 90°.

The whole injection and combustion cycle of a cylinder within a working cycle of the internal combustion engine is divided into a first time period $t_{BÜ}$ during which calculation and transmission of the control data set is carried out, a time period $t_{VE}$ during which injection is prepared and a time period $t_E$ during which the actual injection of fuel into the cylinder combustion chamber takes place. There might be a time gap, characterized as $t_{Tol}$, between the end moment when calculation and transmission of the control data set is finished and the start moment for preparing injection, representing a tolerance gap in the injection and combustion cycle of a cylinder. The injection period $t_E$ decreases or increases as a function of the load acting on the internal combustion engine. Specifically, the starting point of injection is varied, while the end point remains constant. The injection period can be extended until the tolerance interval $t_{Tol}$ has been completely used up; particularly in case of significant load increases, it can also fall into the first time period $t_{BÜ}$.

Figure 3:
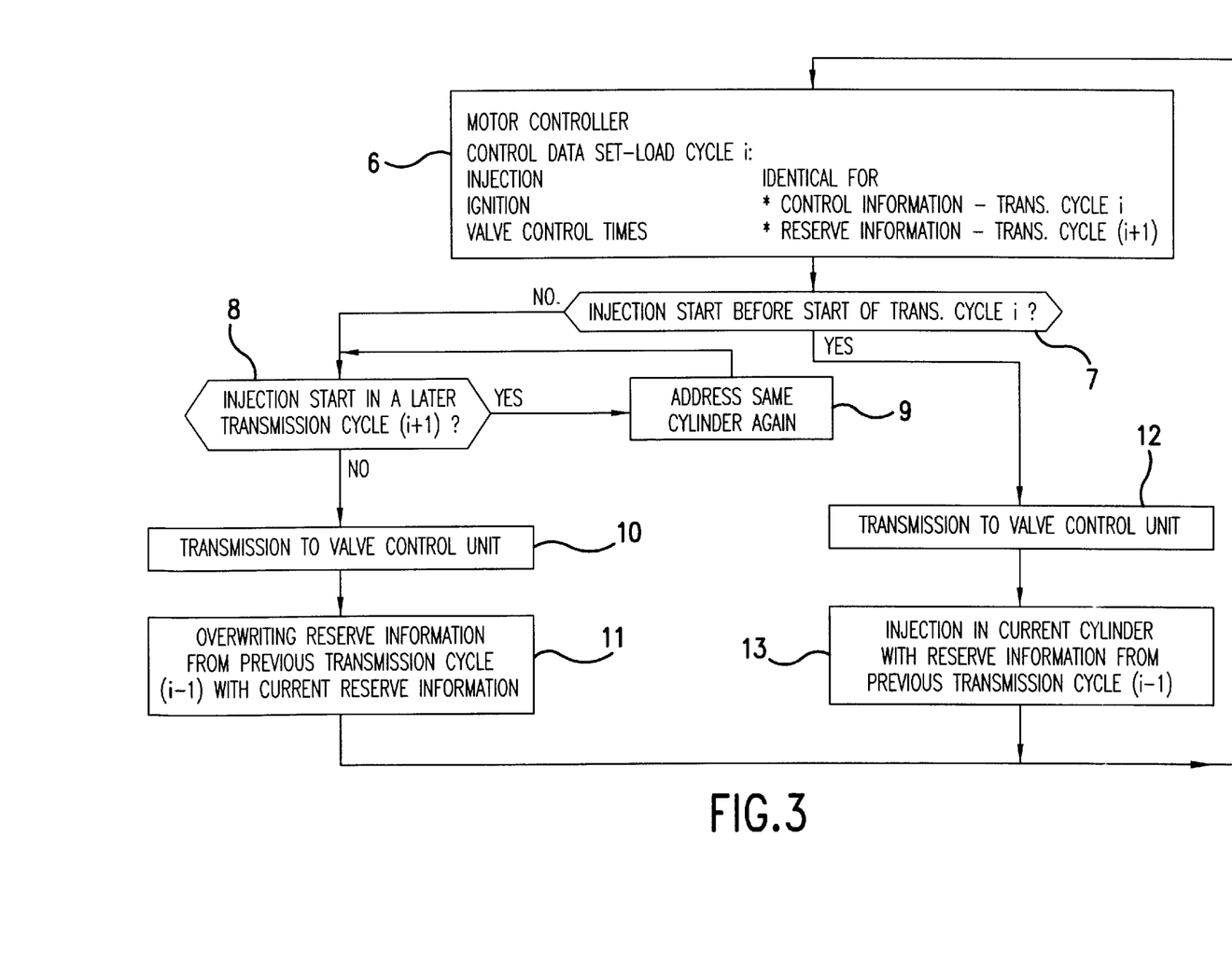
FIG. 3 is a flow chart which shows the procedural steps to be taken in the control device for load-controlled adjustment of injection moment and injection period.

According to the flow chart in FIG. 3, in a first procedural step (6), a control data set is generated in the motor controller; this control data set contains control information with regard to injection, ignition and control of gas shuttle valves. Each control data set includes a double set of control information: current control information for an internal combustion engine cylinder to be addressed in the current transmission cycle (i) and reserve information intended for the next following cylinder in the following transmission cycle (i+1). The two information sets are intended for load cycle (i), both are identical.

In procedural step (7), an inquiry takes place to find out if, due to an increased load demand, the injection start for the cylinder currently to be addressed in transmission cycle (i) would, in terms of time, occur before the start of the current transmission cycle (i). If this is not so, the inquiry proceeds along the NO branch to procedural steps (8) through (11). If, on the other hand, this is the case the injection period determined as a function of the load would exceed the time period that is available (graphically indicated by the time spans $t_{Tol}$, $t_{VE}$, and $t_E$ in FIG. 2), so that in the current transmission cycle (i) an injection of fuel into this cylinder cannot take place with the determined current control information; in this case, the inquiry proceeds along the YES branch to procedural steps (12) and (13).

Procedural steps (8) through (11), which are taken in case the NO branch is selected at procedural step (7), represent either a load condition that is essentially stable or a load decrease. In this case, injection in the cylinder currently to be addressed is carried out with control information from the control data set of the current transmission cycle (i). A further inquiry according to procedural step (8) first verifies whether due to load reduction the injection start falls into a later transmission cycle (i+1). In this case, the inquiry proceeds along the YES branch to procedural step (9); the same cylinder with control information from the existing control data set of transmission cycle (i) is addressed again in the following transmission cycle (i+1).

The inquiry according to procedural step (8) is repeated until the injection start falls into the current transmission cycle; when this occurs, the inquiry proceeds along the NO branch to the following procedural step (10) according to which the control data set is transmitted to the valve control unit, and subsequently in step (11), injection takes place using control information of the control data set generated in transmission cycle (i) Furthermore, in procedural step (11) current reserve information of the transmission cycle (i) overwrites saved reserve information from the previous transmission cycle (i−1).

In the event that a load increase is identified in procedural step (7), the inquiry proceeds along the YES branch from procedural step (7) to procedural step (12), according to which the control data set generated in step (6) is transmitted to the valve control unit. According to this YES branching, the injection start occurs before the current transmission cycle (i) starts so that injection in the cylinder currently to be addressed cannot be performed with the control information from the control data set generated. In this case, according to procedural step (13), the cylinder falls back on the reserve information saved from the previous transmission cycle (i−1) which represents the load condition existing during the transmission cycle immediately preceding the current one; this load condition from the previous cycle corresponds to a shorter injection period. The injection process can be started in the current transmission cycle (i) with reserve information from the previous transmission cycle (i−1).

After proceeding through procedural steps (8) through (11) or (12) and (13), the inquiry returns to procedural step (6); in a subsequent transmission cycle a new control data set for the next following cylinder is generated.

Figure 4:
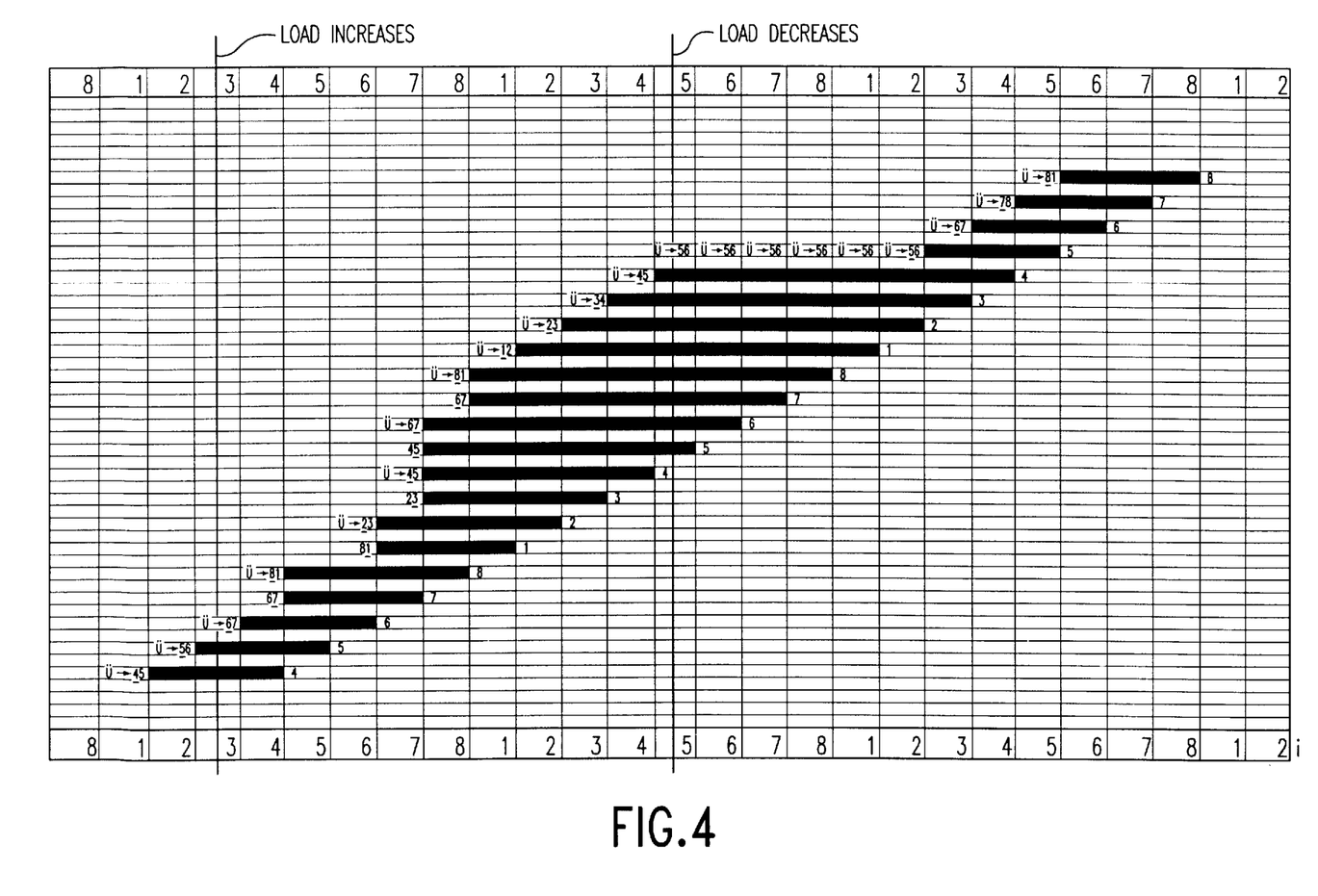
FIG. 4 is a graphic depiction of cylinder addressing with injection start and injection period assigned to each individual cylinder, recorded over crank angle synchronous ignition intervals.

FIG. 4 shows cylinder addressing of successive cylinders 1 through 8 of an internal combustion engine as a function of crank angle synchronous time intervals; whereby each transmission cycle takes place between two successive moments marked by vertical lines in FIG. 4. In ascending order from bottom left to top right the representation shows the individual injection periods, each marked with a black bar, for each individual cylinder; the cylinders are identified on the right side of each bar. On the left side of each bar, the assigned control data set characterized by two figures is recorded with the letter "Ü" marking the transmission of each data set.

In the diagram of FIG. 4, the internal combustion engine initially has a stable load condition. During transmission cycle i=3 (i.e. within the two vertical lines to the left and right of number "3" in FIG. 4) a load increase takes place, while during transmission cycle i=5 of the following working cycle, a load decrease takes place; then, the internal combustion engine runs in a stable mode again.

During the first transmission cycle i=1, cylinder 4 is addressed with control data set "45"; this control data set is transmitted in the first transmission cycle i=1. Cylinder 4 is addressed with the current control information "4"; this process is marked graphically by the underlined number "4" in control data set "45". The reserve information of this control data set marked "5" is saved in a memory unit of the valve control unit while reserve information from the previous transmission cycle is overwritten. Reserve information "5" is assigned to the next following cylinder 5.

In the following transmission cycle i=2, a control data set "56" is generated and transmitted, injection of cylinder 5 is performed with the control information "5", and reserve information "6" for the next following cylinder 6 overwrites reserve information "5" from the previous transmission cycle (i−1). The transition from addressing cylinder 4 to addressing cylinder 5 is characterized by a stable running mode of the internal combustion engine; the injection period is the same for the two cylinders.

The injection period of the next following cylinder 6 which is supplied with control information "6" of a transmitted control data set "67" also corresponds to the injection times of the two previous cylinders. In the current transmission cycle i=3 which is assigned to this cylinder 6, a load increase marked by a vertical line takes place triggering a longer injection period.

In the next following cylinder 7 to be addressed in transmission cycle i=4, no control data set can be transmitted since creation and generation of a new control data set assigned to this cylinder cannot take place within the time available for calculation, transmission and injection. For that reason, the cylinder falls back on reserve information "7" which is marked with an underscore and originates from the previous transmission cycle i=3 for addressing cylinder 7. The injection period provided in the reserve information corresponds exactly to the injection period provided in the corresponding control information of transmission cycle i=3; since it originates from the previous cycle, the injection period for cylinder 7 is identical to the one of the previous cylinder despite the increase in load demand which has taken place in the meantime.

At the same time that cylinder 7 is addressed with reserve information from the previous transmission cycle i=3, a new control data set "81" is generated and transmitted in the current transmission cycle i=4. The new control data set "81" contains current control information "8", with which the current cylinder 8 can be addressed, and reserve information "1" for the following cylinder 1. The current control data set "81" now takes the load increase into account and increases the injection period accordingly with regard to the previous cylinders to be addressed. However, the increase in the time period available for injection has been selected in a way that the injection start can be begun in the current transmission cycle i=4.

A continuous increase of the injection period takes place between transmission cycle i=4 of the current working cycle and the following transmission cycle i=4 assigned to the next working cycle of the internal combustion engine; whereby for each transmission cycle i=4, 5, 6, etc. one cylinder is supplied with reserve information of the immediately preceding transmission cycle while the following cylinder is supplied with current control information of the currently transmitted control data set.

In transmission cycle i=4 of the following working cycle of the internal combustion engine, a sudden, significant load reduction takes place resulting in a correspondingly significant shortening of the injection period. In the next transmission cycle i=5 in which control data set "56" is generated and transmitted and which is assigned to cylinder 5 currently to be addressed, it has been noticed that the injection start of cylinder 5 does not take place in the currently running transmission cycle i=5 but in a later transmission cycle. As a result, in the following transmission cycle i=6, the same control data set "56" is used again for addressing cylinder 5; this process is repeated until the injection start of the cylinder currently to be addressed falls into the currently running transmission cycle; this is the case in the model for transmission cycle i=2. The injection of cylinder 5 now takes place using control information "5" of control data set "56" with the injection start falling into transmission cycle i=2.

In the following process, a stable mode with constant injection times for the subsequent cylinders sets in. Accordingly, a control data set is generated and transmitted for each new cylinder to be addressed using current control information of the control data set from the current transmission cycle for injection in each instance.

The increase and reduction in load demand can be implemented in any order and without delay.

Figure 5:
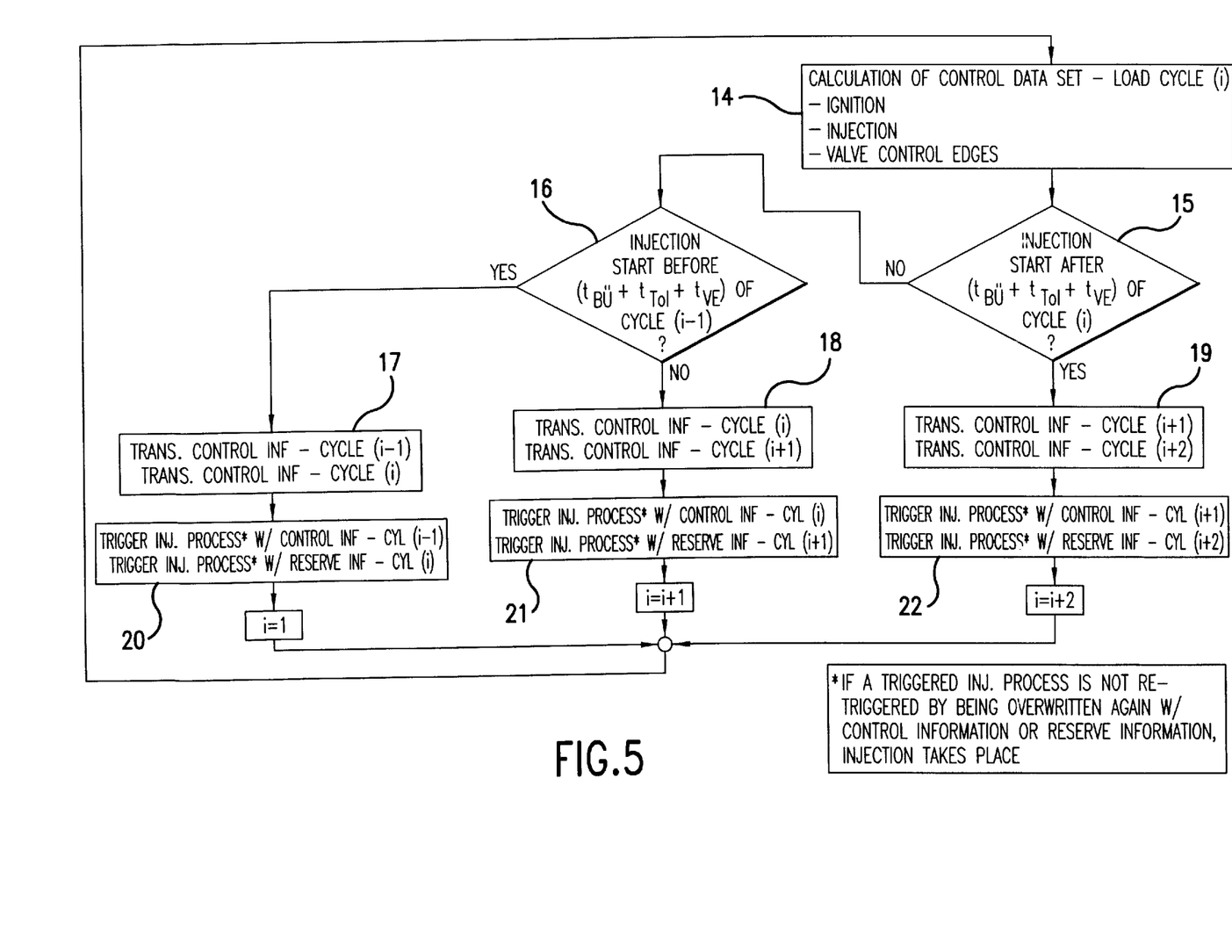
FIG. 5 is another flow chart which shows the procedural steps to be taken in the control device for load-controlled adjustment of injection moment and injection period according to the invention.

FIG. 5 represents another model in accordance with the invention. In a first procedural step (14), a control data set is generated by means of the load of cycle (i), whereby the control data set contains parameters for ignition, injection and valve control edges or valve control times. The injection start for cycle (i) is determined as described hereinafter.

First, an inquiry is carried out in procedural step (15) to determine if the injection start of the current cycle (i), in terms of time, falls into a time period which comes after expiration of the time periods $t_{BÜ}$, $t_{Tol}$ and $t_{VE}$ (see FIG. 2) of the current cycle (i); whereby in the first period of time $t_{BÜ}$ calculation and transmission of the control data set take place and in time period $t_{VE}$ injection is prepared whereas time period $t_{Tol}$ characterizes a tolerance interval. If the time periods $t_{BÜ}$, $t_{Tol}$ and $t_{VE}$ have already expired, the inquiry proceeds along the YES branch to procedural step (19) according to which a control data set with control information for the cycle (i+1) and further control or reserve information for a cycle (i+2) are transmitted. In the ensuing procedural step (22), the injection process is carried out or triggered provided that the control information or reserve information have not been overwritten by means of re-triggering. For cylinder (i+1), triggering of the injection process takes place using control information of the control data set, whereas for cylinder (i+2) reserve information is used. After transmission and triggering of the injection process, index "i" characterizing the cycle is increased by the value 2; then, the process returns to step (14) to begin the procedure.

If in the inquiry after step (15) it is determined that, in terms of time, the injection start precedes expiration of time periods $t_{BÜ}$, $t_{Tol}$ and $t_{VE}$, the inquiry proceeds along the NO branch of this procedural step to procedural step (16) where another inquiry is performed to specify the injection start. In procedural step (16), inquiry is performed as to whether, in terms of time, the injection start comes before the beginning of time periods $t_{BÜ}$, $t_{Tol}$ and $t_{VE}$ of cycle (i−1). If this is so, the inquiry proceeds along the YES branch to procedural steps (17) and (20). In this case, control information for cycle (i−1) and control or reserve information for cycle (i) are transmitted (procedural step 17). In the following procedural step (20), the injection process is triggered with control information for cylinder (i−1) and with reserve information for cylinder (i). In case of the left procedural branch with procedural steps (17) and (20) (injection start comes before the time periods $t_{BÜ}$, $t_{Tol}$ and $t_{VE}$ of cycle (i−1)), after transmission of control information and triggering of the injection process, index "i" is not increased but kept at the current level, and at that level the entire procedure starting with procedural step (14) is run through again.

If the injection start does not come after the time periods $t_{BÜ}$, $t_{Tol}$ and $t_{VE}$ of cycle (i) and not before the time periods $t_{BÜ}$, $t_{Tol}$ and $t_{VE}$ of cycle (i−1) (NO branch of procedural step (16)), control information for cycle (i) and control or reserve information for cycle (i+1) are transmitted according to procedural step (18). The injection process is triggered with control information for cylinder (i) and reserve information for cylinder (i+1) according to procedural step (21). After that, the process returns to procedural step (14) while index "i" is increased by the value 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling an internal combustion engine in which a motor controller determines an injection point and injection period for internal combustion engine cylinders in crank angle synchronous transmission cycles, as a function of a load acting on the internal combustion engine, and transmits the determined injection point and injection period to actuators that are assigned to the cylinders, as a control data set for execution of an injection, wherein:

for every transmission cycle in the control data set, said controller transmits control information for injection of a cylinder currently to be addressed, and reserve information for injection of a cylinder to be addressed in the following transmission cycle; and at least said reserve information is saved for at least one transmission cycle;

in a stable running mode, control information from a current transmission cycle is used for fuel injection into the cylinder currently to be addressed, and one of current control information and reserve information from the current transmission cycle overwrites reserve information from a previous transmission cycle; and upon the occurrence of a load increase that increases injection periods in such a significant way that, in terms of time, injection start in the cylinder currently to be addressed would come before start of a current transmission cycle, reserve information from a next preceding transmission cycle is used for injection of the current cylinder.

2. The method according to claim 1, wherein if a load increase occurs when reserve information is being used for a current cylinder, simultaneously, a new control data set with control information concerning a next following cylinder and reserve information for a next to next following cylinder is generated and transmitted.

3. The method according to claim 1, wherein injection start is adjusted in a load-controlled way, whereby injection takes place earlier in the event of a load increase, while injection takes place later in the event of a load reduction.

4. The method according to claim 1, wherein an opening moment of variably adjustable gas shuttle valves is changed.

5. The method according to claim 1, wherein electromagnetically operable gas shuttle valves are used.

6. The method according to claim 1, wherein the control data set is generated in a motor controller and transmitted to at least one valve control unit.

7. The method according to claim 1, wherein upon occurrence of a load reduction such that the injection start for the current cylinder falls into a subsequent transmission cycle, substantially constant control information and constant reserve information are transmitted in successive control data sets to a cylinder currently to be addressed, in at least two successive transmission cycles.

8. The method according to claim 7, wherein constant control information and constant reserve information in the control data set are transmitted to a particular cylinder until an injection point for the particular cylinder falls into the same transmission cycle as a current transmission of control information.

9. The method according to claim 1, wherein the control data set contains additional actuating variables with regard to internal combustion engines.

10. The method according to claim 9, wherein the additional actuating variables include at least one of actuating variables for ignition and operation of variably adjustable gas shuttle valves.

11. A control device for an internal combustion engine, comprising a motor controller for load-controlled determination of a control data set for an injection point and an injection period for internal combustion engine cylinders, said control data set being supplied to actuators assigned to cylinders of the internal combustion engine in crank angle synchronous transmission cycles, wherein:

the control data set generated in the motor controller contains control information for injection of a cylinder currently to be addressed and reserve information for injection of a cylinder to be addressed in a next successive transmission cycle;

at least one valve control unit is provided, to which the control data set from the motor controller can be supplied and in which actuating signals for the actuators concerned with injection can be generated from the control data set that has been received;

the at least one valve control unit includes a memory unit in which at least reserve information of the control data set can be saved; and control signals supplied to the valve control unit are generated such that in a stable running mode, control information from a current transmission cycle is used for determining actuating signals for the actuators concerned with injection, and reserve information from the current transmission cycle overwrites reserve information from the previous transmission cycle in the memory unit, and upon occurrence of a load increase which increases injection periods in such a significant way that, in terms of time, the injection start in the cylinder currently to be addressed would come before start of a current transmission cycle, reserve information for injection of the current cylinder, stored in the memory unit, is used for determining actuating signals.

12. The control device according to claim 11, wherein one valve control unit is assigned to each row of cylinders of the internal combustion engine.

* * * * *